Nov. 6, 1956  J. SELZER  2,769,384
PLOW
Filed Nov. 16, 1953  2 Sheets-Sheet 1

INVENTOR
JOHN SELZER

Paul O. Pippel
ATTORNEY

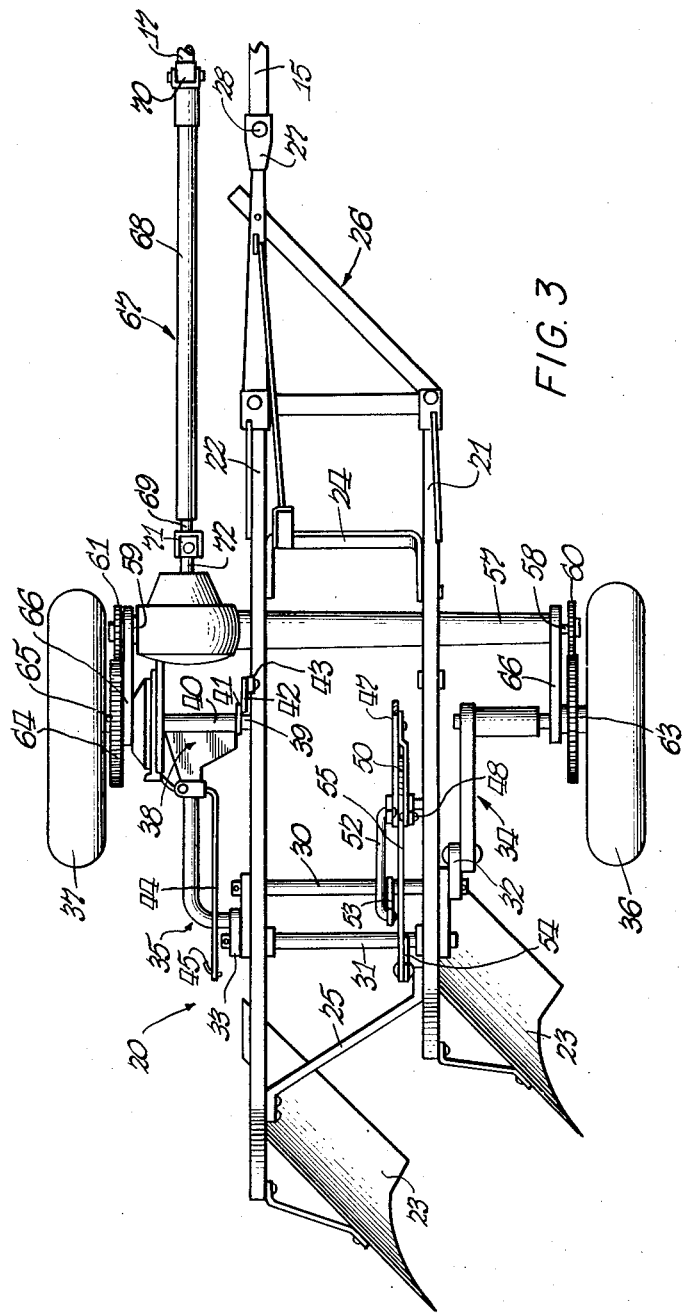

United States Patent Office 2,769,384
Patented Nov. 6, 1956

2,769,384
PLOW

John Selzer, Fort Wayne, Ind., assignor to International Harvester Company, a corporation of New Jersey Application November 16, 1953, Serial No. 392,297

4 Claims. (Cl. 97—46.21)

This invention relates to agricultural implements and particularly to a trail-behind implement adapted to be propelled by a tractor. More specifically, the invention concerns a trail-behind plow.

Moldboard plows and the like are mounted in trailing relation behind a tractor, the plow hitch being connected to the tractor drawbar in such a way as to allow the plow to rise and fall with the changes in contour of the ground and to follow in the path of the tractor as it turns by swinging laterally with the steering of the tractor. One of the tractor wheels and one of the wheels which support the trail-behind plow ride in the furrow previously formed by the plow bottoms. The plow wheels are smaller than the drive wheels of the tractor and slippage occurs therebetween causing dragging of the plow wheels and abnormal wear thereof. A serious disadvantage in this slippage of the plow wheels is the additional burden placed upon the tractor power plant in the extra amount of power required to draw the implement. The principal object of this invention is therefore the provision of means for overcoming these drawbacks of trail-behind plows and contemplates the elimination of slippage of the plow wheels.

Another object of the invention is the provision of means whereby the plow wheels may be operated at the same peripheral speed as the tractor drive wheels so that no slippage occurs between the tractor and the plow wheels and the load upon the tractor power plant is reduced.

A further object of the invention is to provide power transmission means on the frame of the plow having a driving connection with the plow wheels, wherein the transmission means is operated by a direct connection with the tractor power plant.

Figure 1:
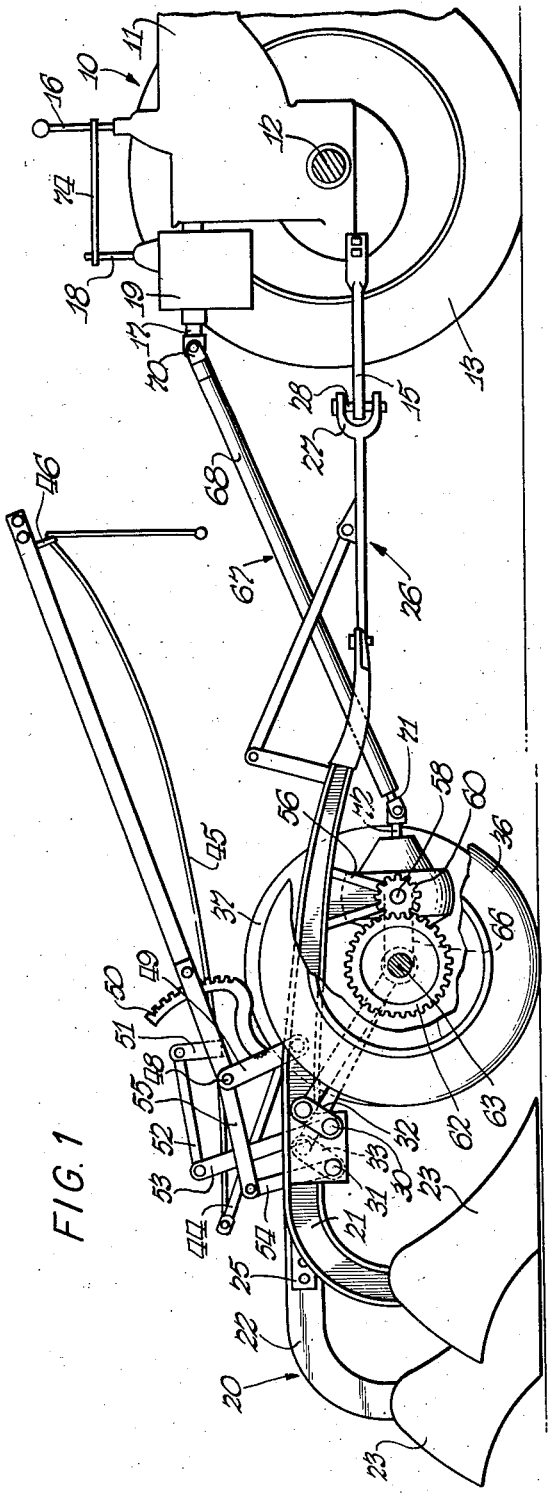
Figure 2:
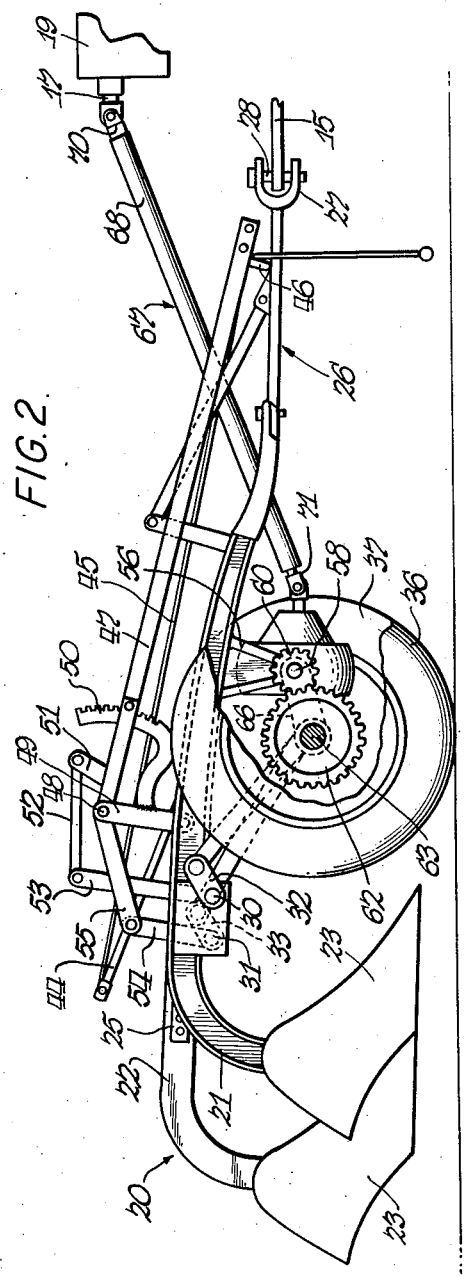

The foregoing and other important objects and desirable features inherent in and encompassed by the invention, together with many of the purposes and uses thereof, will become readily apparent from a reading of the ensuing description in conjunction with the annexed drawing, in which, Figure 1 is a side elevational view of the rear end of a tractor having a plow embodying the features of the invention, with parts broken away for clarity, connected thereto in draft receiving relation;

Figure 2 is a view similar to Figure 1 showing the plow bottoms in a raised or transport position with respect to the ground; and Figure 3 is a plan view of the structure shown in Figure 1.

Referring to the drawings, numeral 10 designates a tractor having a power plant 11, a transversely extending rear axle 12, and transversely spaced rear ground-engaging drive wheels 13 (only one is shown in Figure 1). The tractor is also provided with a conventional drawbar 15, a gear shift lever 16, and a power take-off shaft 17. A throw-out lever 18 is also provided for the power take-off shaft 17, and suitable conventional gearing, not shown, is enclosed in a housing 19 for stepping up the speed of the power take-off shaft for a purpose to be disclosed hereinafter.

Attached to the tractor to be drawn thereby is an agricultural implement 20 in the form of a two-bottom mold-board plow having a frame structure composed of laterally spaced beams 21 and 22, beam 22 projecting rearwardly beyond the rear end of beam 21. The rear ends of these beams 21, 22 are curved downwardly and have plow bottoms 23 mounted thereupon. As shown in Figure 3, beams 21 and 22 are connected by longitudinally spaced transverse braces 24 and 25, and a hitch structure 26, mounted upon the front end of the beams and provided with a clevis 27 at its forward end, is pivotally connected to the drawbar 15 of the tractor by a pin 28. Pin 28 is adapted to be received in any one of a plurality of apertures formed in the transverse portion of the drawbar 15. By virtue of this pivotal connection of the hitch 26 to the drawbar 15, the plow is capable of lateral swinging relative to the tractor, and further by virtue of the play in the connection vertical pivotal movement is also permitted.

Supported by the beams 21 and 22 are a pair of transverse shafts 30 and 31. The shafts 30 and 31 extend through bearing plates rigidly secured to the beams 21, 22 and are capable of rocking with respect to the beams. Secured to one end of the rock shaft 30 outwardly of the beam 21 is an arm 32 which extends perpendicular to the rock axis of the shaft 30. A similar arm 33 is fixed to the shaft 31 outwardly of the beam 22. A pair of crank axle assemblies 34, 35, each having one end thereof pivotally connected, respectively, to the free end of an arm 32, 33, comprises forwardly and downwardly extending sections upon the ends of which are journaled laterally spaced, ground engaging plow wheels 36 and 37.

In order to vertically move the plow frame with respect to the supporting wheels 36, 37 between operating and transport positions, the crank axle assembly 35 has connected thereto lift mechanism designated by the numeral 38, preferably of the half-revolution clutch type. The lift mechanism 38 is mounted on the section of the crank axle assembly 35 through the intermediary of a stub axle 39 rotatable in a bearing 40. The constructional details of the half-revolution clutch are conventional and form no part of the present invention. It is to be understood, however, that the clutch operating between the wheel 37 and the stub shaft 39 rotates the latter through approximately 180°, to raise or lower the plow frame with respect to the supporting wheels. To this end the stub shaft 39 has secured thereto a crank arm 41 which is connected by a generally vertically extending link 42 with a lug 43 mounted upon the plow beam 22. Rotation of the stub shaft 39, therefore, through the actuation of the clutch connecting the wheel 37 to the stub shaft, exerts thrust through the link 42 to raise or lower the plow frame with respect to the supporting wheels 36, 37. The clutch is actuated to raise or lower the plow by a lever 44 connected to a cable 45 extending forwardly and received in a loop 46 connected to a lever 47 pivotally mounted at 48 upon an arm 49 pivotally mounted upon the plow beam 21 and extending upwardly therefrom. Lever 47, is movable over a quadrant 50, secured to arm 49, and is provided with conventional detent mechanism for holding it in an adjusted position with respect thereto. A lug 51 affixed to the lever 47 is connected by a link 52 with an arm 53 mounted upon the transverse shaft 30. Secured to the transverse shaft 31 and extending upwardly therefrom is another arm 54. Arm 54 is connected by a link 55 with arm 49 so that rocking of the transverse shaft 31, in response to actuation of the clutch lift 38, is transmitted through link 55 to arm 49 and link 52 to arm 53 mounted on the transverse shaft 30. Thus, the clutch lift 38 rocks both transverse shafts 30 and 31 in unison to raise and lower the plow wheels 36 and 37 with respect to the plow frame. During operation, the wheel 36 oftentimes travels in the same furrow of the righthand tractor drive wheel 14 while the plow wheel 37 rides upon the top surface of the ground. Hence, the wheel 36 must be vertically spaced further away from the plow frame than the wheel 37. Wheel 36 is adjustable with respect to the plow frame as well as wheel 37 by moving lever 47 over the quadrant 50 causing transverse shaft 30 to rock independently of the transverse shaft 31.

Affixed to and depending from the plow beams 21, 22 near the forward ends thereof are supporting brackets 56. These brackets 56 support a transversely extending axle housing 57 at their lower ends in which drive axles 58 and 59 are rotatably mounted. Secured to the shafts 58 and 59 are gears 60 and 61, respectively. The gear 60 meshes with a gear 62 of larger diameter mounted upon the hub 63 of the wheel 36 and, similarly, gear 61 meshes with a gear 64 mounted upon the hub 65 of the wheel 37. Extending between the ends of the axle housing 57, and hubs 63 and 65 are links 66. Each link 66 has one end rotatably connected to the axle housing 57 and its other end rotatably connected to a respective hub 63, 65 whereby the gear 60, 61 are maintained in meshing relationship with gears 62, 64 in all positions of adjustment of the wheels 36, 36 with respect to the plow frame structure.

Shafts 58 and 59 are driven by a telescoping shaft 67 comprising a sleeve 68 and a shaft member 69, the former being connected by a universal joint 70 with the power take-off shaft 17 of the tractor and member 69 being connected by a universal joint 71 with a shaft 72 projecting from a housing 73 in which is carried conventional differential drive mechanism (not shown) connecting the shafts 58 and 59, whereby forward motion may be transmitted to both of the plow wheels 36 and 37. The telescoping of shaft 67 and the connection thereof to shafts 17 and 72 through the intermediary of universal joints 70 and 71 permits the plow to move laterally and vertically relative to the tractor without disrupting the drive between the tractor power plant and the plow wheels. As pointed out hereinbefore, the housing 19 encloses suitable gearing for stepping up or changing the speed of the power take-off shaft 17 so that the wheels 36 and 37 of the plow may be driven at a higher rotary speed to equal the peripheral speed at which the tractor wheels 13 are driven so that slippage between the plow wheels and the tractor is prevented.

Upon turning of the tractor at the end of a field or for transport purposes, the frame of the plow is elevated relative to the wheels by rocking transverse shafts 30 and 31 in a clockwise direction, as viewed in Figure 1, causing the crank axle assemblies 34, 35 to assume the positions shown in Figure 2. The wheels 36 and 37, carried by the crank axle assemblies 34 and 35, respectively, are thus moved vertically away from the plow frame. It will be noted that the gears 60 and 61 are maintained in driving relationship with gears 63 and 64 regardless of the position of the plow frame with respect to the ground by virtue of links 66.

The operation of the tractor and of the power-operated plow connected thereto are synchronized by the provision of a link 74 connecting the gear shift lever 16 and the power take-off actuating lever 18. The mechanism by which the motion of gear shift lever 16 is transmitted to the lever 18 is conventional and is not shown in detail. Mechanism adequate for this purpose is disclosed, for example, in the patent to G. M. Beimer, 2,255,643, which issued on September 9, 1941. The plow lift is actuated by the operator of the tractor who grasps the cable 45 adjacent the forward end of the lever 47 and moves the lever 44 to operate the lift.

The embodiment of the invention chosen for the purposes of illustration and description herein is that preferred for achieving the objects of the invention and developing the utility thereof in the most desirable manner. It will be appreciated, therefore, that the particular structural and functional aspects emphasized herein are not intended to exclude, but rather to suggest, such other adaptations and modifications of the invention as fall within the spirit and scope of the invention as defined in the appended claims.

I claim:

1. The combination with a tractive vehicle having drive wheels and a power take-off, of a trail-bound implement having a supporting frame connected to the vehicle for lateral and vertical swinging movement relative thereto; earth-working tools carried by the frame; laterally spaced ground wheels; means for mounting each of said ground wheels on the frame for generally vertical and longitudinal movement relative thereto to raise and lower the frame and earth-working tools including an arm associated with each ground wheel and mounted on said frame for generally vertical rocking movement, a crank axle pivotally connected to each of said arms adapted for generally vertical swinging and longitudinal movement as a whole relative to the frame, said implement wheels being mounted on the crank axles, and link means interconnecting said crank axles and said frame; and means for driving said implement wheels at the same peripheral speed as the vehicle drive wheels in all positions of the implement frame relative to the vehicle comprising drive means on said implement wheels, transmission means on the frame engageable with the wheel drive means, and a driving connection between the power take-off and said transmission means.

2. The combination with a tractive vehicle having drive wheels and a power take-off, of a trail-behind implement having a supporting frame connected to the vehicle for lateral and vertical swinging movement relative thereto; earth-working tools carried by the frame; laterally spaced ground wheels; means for mounting said ground wheels on the frame for generally vertical and longitudinal movement relative thereto to raise and lower the frame and earth-working tools including a pair of crank axles, each of said crank axles having an implement wheel mounted on one end thereof, a pair of transversely extending rock shafts carried by the frame, each of said rock shafts having an arm fixed thereto adapted to rock in a vertical plane, the ends of said crank axles opposite said implement wheels being pivotally connected, respectively, to said arms, for vertical swinging movement relative to said arms, and link means interconnecting said crank axles and said frame; and means for driving said implement wheels at the same peripheral speed as the vehicle drive wheels in all positions of the implement frame relative to the vehicle and the implement wheels comprising drive means on said implement wheels, transmission means on the frame engageable with the wheel drive means, and a driving connection between the power take-off and said transmission means.

3. The combination substantially as set forth in claim 2, in which said wheel drive means includes a gear carried by each implement wheel and said transmission means includes a pair of gears rotatably mounted on said frame meshable with said wheel-carried gears.

4. The combination substantially as set forth in claim 3, in which said link means includes a pair of links, each of said links having one end pivotally connected to a respective crank axle and its opposite end pivotally connected to said frame, the pivotal connections of said links to said frame being in transverse alignment with each other and with the rotational axes of the gears mounted on said frame, and the pivotal connection of each link to a respective crank axle being coaxial with the rotational axis of the gear carried by the wheel mounted on the crank axle.

References Cited in the file of this patent

UNITED STATES PATENTS

| | | |
|---|---|---|
| 821,070 | Weaver | May 22, 1906 |
| 1,353,393 | Haupt | Sept. 21, 1920 |
| 1,640,621 | Smith | Aug. 30, 1927 |
| 1,926,935 | Bottini | Sept. 12, 1933 |
| 2,440,779 | Morkowski | May 4, 1948 |